United States Patent [19]

Beard

[11] Patent Number: 5,284,721

[45] Date of Patent: Feb. 8, 1994

[54] HIGH ENERGY ELECTROCHEMICAL CELL EMPLOYING SOLID-STATE ANODE

[75] Inventor: Kirby W. Beard, Perkasie, Pa.

[73] Assignee: Alliant Techsystems Inc., Edina, Minn.

[21] Appl. No.: 561,132

[22] Filed: Aug. 1, 1990

[51] Int. Cl.$^5$ ............................................ H01M 6/14
[52] U.S. Cl. .................................... 429/194; 429/195; 429/196; 429/197; 429/218
[58] Field of Search .............................. 429/194–198, 429/218

[56] References Cited

U.S. PATENT DOCUMENTS

| H723 | 1/1990 | Plichta et al. | 429/194 |
|---|---|---|---|
| 3,791,867 | 2/1974 | Broadhead et al. | 136/6 R |
| 3,898,096 | 8/1975 | Heredy et al. | 136/6 F |
| 4,009,052 | 2/1977 | Wittingham | 429/191 |
| 4,041,220 | 8/1977 | Armand | 429/191 |
| 4,139,680 | 2/1979 | Schlaikjer | 429/50 |
| 4,194,062 | 3/1980 | Carides et al. | 429/194 |
| 4,208,474 | 6/1980 | Jacobson et al. | 429/191 |
| 4,302,518 | 11/1981 | Goodenough et al. | 429/104 |
| 4,317,873 | 3/1982 | LeMehaute et al. | 429/197 |
| 4,340,652 | 7/1982 | Raistrick et al. | 429/112 |
| 4,357,215 | 11/1982 | Goodenough et al. | 204/2.1 |
| 4,381,258 | 4/1983 | LeMehaute et al. | 252/519 |
| 4,423,125 | 12/1983 | Basu | 429/194 |
| 4,542,009 | 9/1985 | Palmer | 423/561 R |
| 4,547,442 | 10/1985 | Besenhard et al. | 429/209 |
| 4,585,718 | 4/1986 | Uedaira et al. | 429/224 |
| 4,604,334 | 8/1986 | Tarascon | 429/194 |
| 4,668,595 | 5/1987 | Yoshino et al. | 429/194 |
| 4,668,596 | 5/1987 | Shacklette et al. | 429/194 |
| 4,677,041 | 6/1987 | Specht | 429/206 |
| 4,684,590 | 8/1987 | Sammels | 429/194 |
| 4,687,716 | 8/1987 | Nagaura et al. | 429/145 |
| 4,751,160 | 6/1988 | Plichta et al. | 429/197 |
| 4,758,484 | 7/1988 | Furukawa et al. | 429/194 |
| 4,770,960 | 9/1988 | Nagaura et al. | 429/194 |
| 4,804,596 | 2/1989 | Ebner et al. | 429/194 |
| 4,820,599 | 4/1989 | Furukawa et al. | 429/194 |
| 4,828,834 | 5/1989 | Nagaura et al. | 429/194 |
| 4,853,304 | 8/1989 | Ebner et al. | 429/192 |
| 4,891,282 | 1/1990 | Nagaura et al. | 429/194 |
| 4,904,552 | 2/1990 | Furukawa et al. | 429/197 |
| 5,015,547 | 5/1991 | Koshiba et al. | 429/194 |

FOREIGN PATENT DOCUMENTS

| 1-079014 | 3/1989 | Japan | C01G 23/00 |
|---|---|---|---|
| 2-221106 | 9/1990 | Japan | C01B 13/32 |

OTHER PUBLICATIONS

Zachu—Christiansen, B et al, "Lithium Insertion in Different Titanium Dioxide Modifications" Solid State Ionics, 1987, 28–30 (Pt 2) pp. 1176–1182.

Abstract and references from "Preparation and Characterization of Some Lithium Insertion Anodes for Secondary Lithium Batteries", K. M. Abraham, D. M. Pasquariello, and E. B. Wilstaedt, Journal of the Electrochemical Society, vol. 137, No. 3, pp. 743 and 749, Mar. 1990.

J. M. Tarascon, "Mo$_6$Se$_8$: A New Solid-State Electrode for Secondary Lithium Batteries", Journal of the Electrochemical Society, vol. 132, No. 9, pp. 2089–2093, Sep. 1985.

T. Nagaura, "A Lithium Ion Rechargeable Battery", presented at the Third International Rechargeable Battery Seminar, Mar. 6, 1990, in Deerfield, Florida.

Takata, et al., "Manufacture of secondary lithium batteries", CA Selects: Batteries & Fuel Cells, Issue 16, 1990, p. 4.

J. J. Auborn and Y. L. Barberio, "Lithium Intercalation Cells Without Metallic Lithium," Journal of the Electrochemistry Society, vol. 134, No. 3, pp. 638–640, Mar. 1987.

Primary Examiner—Mark L. Bell
Assistant Examiner—Margaret Einsmann
Attorney, Agent, or Firm—Haugen and Nikolai

[57] ABSTRACT

Improved anodes having active materials consisting substantially of one or more lithium insertion compounds further consisting of transition metal chalcogenides or oxides capable of reversibly intercalating lithium ions are disclosed. Cells utilizing these anodes are also disclosed.

18 Claims, 1 Drawing Sheet

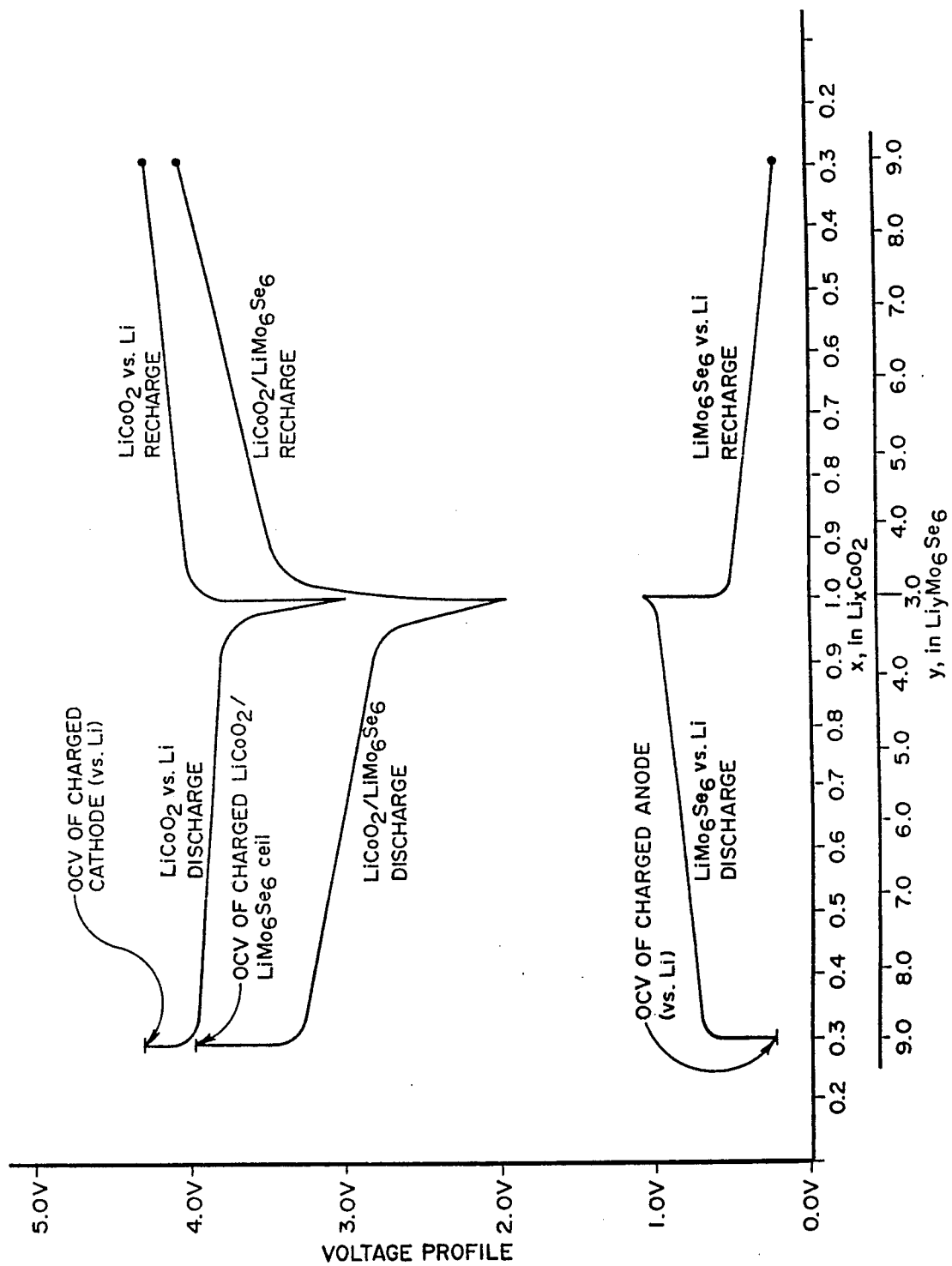

HIGH ENERGY ELECTROCHEMICAL CELL EMPLOYING SOLID-STATE ANODE

BACKGROUND OF THE INVENTION

Field of the Invention

The present invention relates generally to the field of high energy, non-aqueous electrochemical cells and, more particularly, to improvements with respect to the anodes applicable to primary or secondary active metal cells and specifically including those traditionally using anodes of lithium metal. The improved anodes incorporate active materials comprised of one or more lithium insertion compounds consisting of transition metal chalcogenides or oxides capable of reversibly intercalating lithium ions, without the need for the presence of elemental lithium, lithium alloys or other alkali metals themselves

CROSS REFERENCE TO RELATED APPLICATION

Reference is made to application Ser. No. 07/561,134 now U.S. Pat. No. 5,147,739 filed of even date and assigned to the same assignee as the present application. That invention relates to the use of a composite anode consisting of a lithium or lithium alloy substrate to which an intercalation type of compound is adhered, mixed, embedded or otherwise contacted as a dispersed layer, coating, laminate, or mixture.

Description of the Related Art

It is well known that non-aqueous, active metal cells have allowed those skilled in the art to achieve much higher energy densities or energy to weight ratios than had been possible with other combinations. The wide range of potential uses for these cells has led to a great deal of interest in improving the performance and safety of the cells and, more specifically, to developing reliable secondary or rechargeable cells utilizing these materials. Secondary or rechargeable active metal cells typically consist of a light, strongly reducing anode, normally an alkali metal such as lithium, an aprotic, non-aqueous solvent into which the appropriate quantity of an electrolyte salt of the anode metal has been dissolved to form a conductive electrolyte solution, and an oxidizing agent as the cathode material.

More recently, intercalating materials have been used for the positive cathode electrodes. U.S. Pat. No. 4,804,596 to Ebner et al., common of assignee with the present invention, identifies the use of intercalating materials such as $LiCoO_2$, $TiS_2$, $MoS_2$, $V_2O_5$, $V_6O_{13}$ and other such compounds as the cathode electrode when coupled with lithium metal anode electrodes in a rechargeable electrochemical cell. A further patent, U.S. Pat. No. 4,853,304, to Ebner and Lin, also assigned to the same assignee as that of the present invention, discloses an improved non-aqueous electrolyte solution for lithium cells in which an organic ester of formic acid, preferably methyl formate, is combined with an amount of lithium salt and an amount of $CO_2$ to provide improved electrolyte solution performance in secondary or rechargeable lithium cells. The ester-based solution is found to increase conductivity and the $CO_2$ appears to reduce anode polarization and passivation effects. A further patent to Nagaura, et al. is U.S. Pat. No. 4,828,834 which relates to a rechargeable organic electrolyte cell in which the cathode is formed of $LiMn_2O_4$ obtained by sintering manganese dioxide with either lithium carbonate or lithium iodide.

Thus, it can be seen from the above that the related art generally dealt with improvements in the electrolyte system or in cathode materials. In these electrochemical couples or known cell embodiments, lithium or other typical low density, strongly reducing metals or alloys of lithium are specified. However, the plating of lithium metal that has been removed from the cathode back onto the anode electrode during charging and/or the stripping of lithium from the anode during discharging of the cell and intercalation into the cathode has been found to be an inefficient process. The process generally results in the use of an anode electrode dendrite growth or irreversible lithium deposition which leads to eventual failure of the cell due to internal shorting of the plates, loss of sufficient active lithium material or both. In this regard, various additives including electrolyte dopants, changes in electrolyte composition, cell separator materials, and various other design configurations have been attempted to minimize or negate the effects of such inefficient lithium cycling. However, even the best systems which may achieve up to 98% lithium cycling efficiency suffer from severe drawbacks. They have generally been limited to low capacity (less than one-third of the theoretical reversible capacity), shallow depths-of-discharge or low cycle life (less than 500 cycles to failure). Short cycle life is experienced despite the use of excess lithium anode capacity relative to available cathode capacity to increase anode life. While the specific theoretical energy density of these cells based on active materials approaches 600-700 Wh/kg, the actual capacity limitations of the derated cells necessary for longer life is little better than conventional rechargeable batteries. Nickel cadmium cells, for example, are estimated at 225 Wh/kg (on an active material basis). Furthermore, the cells have a limited reliability because of tendencies toward adverse anode reactions. A secondary battery which includes a lithium intercalated graphite compound as the anode active material is disclosed in U.S. Pat. No. 4,423,125. Other lithium intercalation secondary cells using $MoO_2$ and $WO_2$ have been reported by J. J. Auborn and Y. L. Barberio in the *Journal of the Electrochemistry Society*, Vol. 134, No. 3, pp. 638-641. These, however, have not provided as successful as hoped due to a variety of problems including the fact that $MoO_2$ and $WO_2$ compounds both demonstrated an irreversible transition which degraded cycle capacity and life and the voltage profiles of $MoO_2$ and $WO_2$ versus lithium reference electrodes are too high (i.e., only moderately reducing) to provide a system of adequate energy capability when coupled with a higher voltage (i.e., strongly oxidizing) cathode such as $LiCoO_2$. The result is an electrochemical cell with less than 3.0 volt nominal operating potential.

Other, similar anode materials which are useful but which exhibit performance data which in one or more ways is somewhat less than desired are illustrated in several additional references. U.S. Pat. No. 4,668,595 illustrates and describes a secondary battery in which transition metal oxide is specified for use as either anode or cathode material. The material, however, provides less than 1-2 volts when used as the anode even when used in combination with a cathode as strongly oxidizing as $LiCoO_2$. U.S. Pat. No. 4,194,062 also discloses transition metal oxides specified for use as either anode or cathode material but does not teach electrochemical cell couples which would produce the desired 3.0+ V potentials. U.S. Pat. No. 4,668,596 illustrates and describes a variety of materials including transition metal oxide anode compounds but only as one of several materials used in a combination, including alkali metals, as the anode active material. The reference further requires the use of a conjugated backbone polymer.

Thus, there remains a definite need to improve the cycling ability of such cells, particularly in cells capable of operating at higher voltages and capacities. Accordingly, it is a primary object of the present invention to improve the cycling efficiency of high voltage, high capacity, high energy density cells.

SUMMARY OF THE INVENTION

By means of the present invention the efficiency of high energy density secondary or rechargeable cells has been improved by replacing the entire active metal anode, which has normally consisted of pure lithium or alkali metals or alloys, with any one of several types of intercalation/insertion/transition metal chalcogenide or oxide active materials.

Preferable intercalation compounds for the anode are those which combine relatively low molecular weight with the highest or relatively high lithium insertion capabilities at voltages closest to a lithium reference electrode. They can be described using the general formula $Li_xM_aX_b$. The preferable elements for M, the transition metal(s), in the general formula (in approximate order of desirability) appear to be scandium (Sc), titanium (Ti), yttrium (Y), and zirconium (Zr), either individually or as compounds. Higher period or group elements such as lanthanum (La), hafnium (Hf), vanadium (V), chromium (Cr), niobium (Nb), molybdenum (Mo), tantalum (Ta), tungsten (W), manganese (Mn), iron (Fe), cobalt (Co), nickel (Ni), copper (Cu) and zinc (Zn), etc., can also be used, provided the lithium intercalation ability is high and the voltage levels vs. lithium are low. The preferred maximum oxidation state for the above are given by Roman numerals as follows: Sc(III), Ti(III), Y(III), Zr(IV), La(III), Hf(IV), V(II), Nb(III), Mo(III), Ta(IV), W(III), Cr(II), Mn(II), Fe(I), Co(I), Ni(I), Cu(I) and Zn(I). In some cases lower oxidation states may be used. The X element(s) of the general formula, in order of preference, are oxygen (O), sulfur (S), selenium (Se) and tellurium (Te). The value of x, a and b may be expressed in integers, fractions or decimals. It is desirable that the values of a and b be as low as possible. This, of course, depends largely upon the number of moles of lithium atoms inserted into the structure during charge and discharge and also upon their relative ratios.

For certain types of reversible intercalation materials ($LiCoO_2$, $V_6O_{13}$, etc.), the same exact base compounds potentially can be used for both cathode and anode electrodes in the same cell. Thus, if the reversible lithium capacity of the material is high and the voltage differential between lithium-doped (e.g., $Li_{1.5}CoO_2$ at 1.0–1.5 volts versus a lithium reference electrode) and lithium-depleted (e.g., $Li_{0.5}CoO_2$ at ~4.3 volts versus a lithium reference electrode) phases is significant, the same composition is acceptable. Varying the degree of intercalation between the electrodes (lithium rich versus lithium poor) as well as the relative amounts of each electrode's active materials also allows the selection of the best voltage profile and coulombic capacity of the material in question.

The present invention further contemplates a more optimized combination of elements in the form of an electrochemical cell in which the anode includes a highly reducing (low voltage vs. lithium reference electrode), high energy density intercalation compound operated over the reversible range (for example, $Li_9Mo_6Se_6$ corresponding to the "charged" anode with a discharged state corresponding to $Li_{3.2}Mo_6Se_6$); the cathode is a high voltage (relative to a lithium reference electrode), high energy density intercalation compound, such as $Li_xCoO_2$ in the preferred embodiment, operated over the reversible range (for $Li_xCoO_2$, $x \leq 0.3$ in the charged state and $x \geq 1.0$ in the discharged state); and an electrolyte consisting essentially of an organic ester solvent, such as methyl formate, used in the preferred embodiment with a double salt ($LiAsF_6 + LiBF_4$) and $CO_2$ additive at the desired levels. The use of binders, conductive diluents, electrolyte additives, process aids, high purity raw materials, etc., does not appear to diminish or otherwise affect the basis for the solid state anode of the invention.

BRIEF DESCRIPTION OF THE DRAWING

The single FIGURE is a graphical representation of the performance capabilities of a possible solid-state anode/cathode electrochemical cell in accordance with the invention.

DETAILED DESCRIPTION

In the present invention, the pure lithium metal or similar type anode is replaced by any one of a number of various types of intercalation/insertion/transition metal chalcogenide or oxide active materials. As recited above, the preferable intercalation compounds for the anode are those of which combine the lowest molecular weight with the highest lithium insertion capabilities at voltages closest to the lithium reference electrode. The compounds can be described using the general formula $Li_xM_aX_b$; wherein the preferred elements for M, in approximate order of desirability, appear to be reduced (low oxidation) states of Sc, Ti, Y, and Zr, either individually or as compounds. In addition, provided their intercalation ability is high and voltage levels vs. lithium are low, such additional reduced, higher period or group elements as La, Hf, V, Cr, Nb, Mo, Ta, W, Mn, Fe, Co, Ni, Cu, Zn, etc., may be used. Whereas other lower states may occur in certain useful compounds, the maximum oxidation states preferred for the listed elements are: Sc(III), Ti(III), Y(III), Zr(IV), La(III), Hf(IV), V(II), Nb(III), Mo(III), Ta(IV), W(III), Cr(II), Mn(II), Fe(I), Co(I), Ni(I), Cu(I) and Zn(I). The X elements in order of preference are O, S, Se, and Te. The value of x, a and b, of course, may be expressed as an integer, fraction or decimal. It is preferable that the values of a and b be as low as possible relative to the value of x so that the lithium intercalation be maximized.

Under these selection criteria, for example, $TiO_2$ (in the rutile structure) should exhibit up to a 570 mAh/gm faradic capacity at voltages relative to lithium of less than 1.0 V for a two Faraday/mole intercalation reaction going from the +4 to the +2 oxidation state. These relatively high capacities provide cells of rather small energy density (when coupled with lithium anodes) in terms of watt hours per kilogram due to the relatively low system voltage. However, it is noteworthy that using lithium insertion compounds such as $TiO_2$ for the anode can produce high energy density cells if coupled properly with a highly oxidizing cathode such as Li- $CoO_2$. This can produce up to 500 watt hours per kilogram in a working cell based on active material weights.

In addition, it is an important aspect of the present invention that for certain types of reversible intercalation materials ($LiCoO_2$, $V_6O_{13}$, etc.), it is anticipated that the same identical base compounds can potentially be used for both cathode and anode electrodes. This is feasible provided that the reversible lithium capability of the material is high and that the voltage difference between the lithium doped (for example, $Li_{1.5}CoO_2$ at 1.0–1.5 volts versus a lithium electrode) and lithium-depleted (for example, $Li_{0.5}CoO_2$ at 4.3 volts versus lithium reference electrode) phases is significant.

The system illustrated in the single FIGURE would operate at moderate rate discharges at 3.0 V average, and utilizing properly compacted/densified electrodes in the proper balance of coulombic capacities (~8 moles $Li_{0.3}CoO_2$: 1 mole $Li_9Mo_6Se_6$) would provide up to 300–400 Wh/kg and 0.65 Wh/cm$^3$ based on active electrode materials. FIG. 1 shows the projected voltage profiles of the $LiCoO_2/LiMo_6Se_6$ system. A Li/-$LiCoO_2$ cell incorporating the minimum typical excess amounts of lithium to make up for cycle losses has approximately 600–700 Wh/kg and 1.0–1.5 Wh/cm$^3$ volumetric energy density . . . depending on the cycle life design requirements. However, even with the higher levels of the lithium anode materials, the cycle life has still been limited to typically less than 300–500 cycles and dendritic shorting between the electrodes becomes a greater likelihood as well as a potential hazard.

The highly reversible nature of intercalation anodes and cathodes makes cycle lives well in excess of 1000 cycles feasible and also precludes the development of dendrites exhibited on pure lithium anodes. Therefore, on a total cycle life discharge capacity basis (cumulative energy output), the present invention would outperform the standard Li/$LiCoO_2$ cell. On a single discharge cycle capacity basis, a cell in accordance with the present invention also could provide up to ⅔ to ¾ the energy density of pure lithium anode cells and 2–3 times the specific energy of previously proposed similar systems ($Li_xMoO_2/LiC_2$, $CoO_2$, etc.) or conventional standard rechargeable batteries (NiCd).

Table I enumerates a plurality of combinations contemplated for actual cells. To the extent necessary, material from the two cited Ebner, et al. patents is deemed incorporated by reference herein. Table II provides specific energy calculations for certain of these electrochemical systems and includes comparison data with representative current known battery technology.

It is anticipated that the cathode and anode electrode in accordance with the present invention can both be formed in special but conventional processes known to those skilled in the art. The degree of intercalation between the electrodes can be varied, i.e., lithium rich versus lithium poor, as well as the relative amounts of the active materials of each electrode to allow the selection of the best voltage profile and coulombic capacity with regard to the material in question. It is important to select an anode and cathode intercalation couple having sufficient potential and being properly balanced with respect to the reversible capacities of both the anode and the cathode. The intercalation anode compound selected for coupling with the intercalation cathode of interest, must be reversible over the entire range of use and operate in a manner which provides adequate energy capability when coupled with the cathode of interest.

The present invention further contemplates a variety of embodiments. For example, integral solid-state conductive electrolytes can be impregnated into either conventional lithium insertion compound cathodes or lithium insertion compound anodes in accordance with the present invention, or both, to provide a totally solid-state system which eliminates the need for typical liquid electrolytes. It is further contemplated that a lithium intercalation compound can be utilized as a solid-state electrolyte/separator system between the solid-state lithium intercalation anodes and any of the conventional or solid-state cathodes with or without the use of a conventional liquid electrolyte system. Of course, the solid-state lithium intercalation anode of the invention may also be coupled to any of the available type cathodes known in the art for use in electrochemical lithium-based cells.

It is believed that the solid-state anode configured in accordance with the present invention may be coupled to a water-based cathode, which may be a lithium intercalation type cathode, utilizing an aqueous-based electrolyte which may include a non-aqueous co-solvent and any conventional solvent additive. The solid-state lithium intercalation compound anode of the invention, also may be utilized in a system which employs air, specifically $O_2$ and $H_2O$ vapor, as the cathode material.

It is well known that, with respect to safety, lithium cells have long been a cause for concern. The present invention further provides certain safety benefits with respect to lithium cells. The amount of "free" lithium existing in a cell poses a safety hazard. Lithium converted to the molten state (>170° C.) as a result of internal shorting, overheating, cell reversal, overcharging, or the like, is extremely reactive and can produce cell rupture or other catastrophic result. A cell with an intercalation compound for the anode contains no free lithium and that precludes this type of failure. Additionally, intercalation compounds are rate limited by the ionic transport properties within the molecular structure of the chalcogenide or oxide. This reduces the risk of cell rupture from shorting or abusive conditions. Alternatively, however, the porosity of properly compacted intercalation compounds powders still allows for good rate capability. Adverse reactions typical between the highly reactive lithium metal anodes and the electrolyte or the atmosphere are virtually eliminated. Effects such as passivation, poor storage, degradation from non-hermetic cell enclosures, structural/morphological changes in electrodes with cycling and so on are not critical requirements for this newly described technology.

This invention has been described herein in considerable detail in order to comply with the Patent Statutes and to provide those skilled in the art with the information needed to apply the novel principles and to construct and use such specialized components as are required. However, it is to be understood that various modifications can be accomplished without departing from the scope of the invention itself.

TABLE I

Electrochemical Cells Using Lithium Intercalation Anode Compounds

| | General Description | Anode | Cathode | Separator/Electrolyte |
|---|---|---|---|---|
| I. | Standard high voltage, high energy density couples | Any intercalation compound with 1-1.5V (vs. Li) and >200 mAh/gm reversible capacity (e.g., $TiO_2$, $MoS_3$) | $Li_xCoO_2$ $(.3 \leq x \leq 1.0)$ or other high voltage $(\geq 4V$ vs. Li), high capacity (>200 mAh/gm), reversible cathode. | Any of the standard non-aqueous liquid electrolytes and polymer microporous separator. |
| II. | High conductivity, electrochemically stable ester-based electrolyte. | As above (I.). | As above in I. and as shown in U.S. Pat. No. 4 804 596 to Ebner, et al. | High conductivity, ester-based electrolyte solution, including those in which the ester solvent is selected from methyl formate $(HCOOCH_3)$, methyl acetate $(CH_3COOCH_3)$ and the like. Electrolyte salts include $LiAsF_6$, $LiBF_4$ (or combinations thereof), $LiClO_4$, $LiAlCl_4$, $LiGaCl_4$, etc. See U.S. Pat. No. 4 804 596. |
| III. | $CO_2$ additive to organic electrolyte. | As above (I.). | As above in II. | As in II above, preferably $LiAsF_6 + LiBF_4$ in methyl formate. See also U.S. Pat. No. 4 853 304, Ebner, et al. |
| IV. | Solid state polymer and ion conducting electrolyte. | Anodes as in I. above or micro-encapsulated with polymer electrolyte (unrestricted by voltage/capacity, etc.). | Standard cathodes as in I.-III. above or micro-encapsulated polymer type. | Any of various solid state, ionic conductive plastics, ceramics, etc. (anode and/or cathode). |
| V. | Intercalation compound separator/electrolyte. | As in I.-IV. above. | As in I.-IV. above or VI.-IX. below. | A non-electrically, Li ion conductive solid state electrolyte. |
| VI. | Conventional cathode primary and/or secondary batteries. | As in I.-V. above or any other appropriate intercalation compound (unrestricted by voltage/capacities, etc.) | Any of the conventional Li battery cathodes ($SO_2$, $SOCl_2$, $(CF)_n$, $FeS_2$, $CuF_2$, $PbI$, $MnO_2$, $Bi_2Pb_2O_5$, $V_2O_5$, etc.) | Any of the common systems as appropriate for the specific cathode type. |
| VII. | Water cathode primary battery (active or reserve). | As in I.-VI. above. | $H_2O$ reactive material using carbon pad, metal grid, or other current collector. | Aqueous solution of salts, acids, bases, etc. or other appropriate additives. |
| VIII. | Lithium aqueous electrolyte battery. | As in I.-VI. above. | As in I.-VII. above (preferably as in I.-VI. for a rechargeable system). | $H_2O$ electrolyte with salts, co-solvents, etc. for conductivity, stability, etc. |
| IX. | Lithium/air type. | As in I.-VI. above. | Atmospheric $O_2$ and $H_2O$. | LiOH electrolyte; porous screen. |

TABLE II

Hypothetical Examples of Battery Types Detailed in Table I

| Type of Description (Anode/Cathode) | Voltage vs. Li Anode | Voltage vs. Li Cathode | Working Cell | Specific Reversible Capacity, Mah/gm Anode | Specific Reversible Capacity, Mah/gm Cathode | Energy Density (Wh/Kg) | 100% DOD Est. Cycle Life |
|---|---|---|---|---|---|---|---|
| Prior Art: | | | | | | | |
| 1. Li/LiCoO$_2$ (1:1) | 0 | 4 | 4.0 | 3,860 (1 F/M) | 200 (.7 F/M) | 770 | <100 |
| 2. Li/LiCoO (3:1) | 0 | 4 | 4.0 | | | 700 | 1–300 |
| 3. Li/LiCoO$_2$ (6:1) | 0 | 4 | 4.0 | | | 610 200 (@ ⅓ DOD) | 3–500 ~1000 |
| 4. Li$_9$Mo$_6$Se$_6$/MO$_6$Se$_6$ | ½ | 2½ | 2 (1 avg) | 50 (2 F/M) | 50 (2 F/M) | 50 | >1000 |
| 5. MoO$_2$/LiCoO$_2$ | 1½ | 4 | 2.5 | 100 (.5 F/M) | 200 (.7 F/M) | 167 | >1000 |
| 6. WO$_2$/LiCoO$_2$ | 1 | 4 | 3.0 | 62 (.5 F/M) | 200 (.7 F/M) | 142 | >1000 |
| 7. Li/MnO$_2$ (3:1) | 0 | 3½ | 3 | 3.860 (1 F/M) | 300 (1 F/M) | 700 | <3–500 |
| 8. Cd/Ni (non-lithium) | — | — | 1¼ | — | — | 225 | 500–1000 Typ. |
| Present Invention: (Refer to Table I Descriptions) | | | | | | | |
| I.-V. Li$_x$M$_a$X$_b$/LiCoO$_2$(or other similar alternate cathode) | 1–1½ | 4 | 3.0 avg. | >200 req'd | 200 (.7 F/M) | 300 nom. | >1000 |
| a. Li$_{2.5}$MoS$_3$/Li$_{0.3}$CoO$_2$ | 1¾ | 4 | 2¼ | 280 (2 F/M) | 200 (.7 F/M) | 260 | >1000 |
| b. Li$_{2.4}$CoO$_2$/Li$_{0.3}$CoO$_2$ | ¾–1½ | 4 | 3 | 400 (1.4 F/M) | 200 (.7 F/M) | 400 | >1000 |
| c. Li$_9$Mo$_6$/Se$_6$Li$_{0.3}$CoO$_2$ | ¼–¾ | 4 | 3.5 | 300 (6 F/M) | 200 (.7 F/M) | 400 | >1000 |
| VI. Conventional Cathodes | | | | | | | |
| a. Li$_x$M$_a$X$_b$/SO$_2$ | 1–1½ | 3 | 1½–2 avg. | 200 nom. | 419 | 250 nom. (1150 for Li/SO$_2$) | ? |
| b. Li$_x$M$_a$X$_b$/SOCl$_2$ | 1–1½ | 3½ | 2–2½ avg. | 200 nom. | 450 | 300 nom. (1450 for Li/SOCl$_2$) | ? |
| c. Li$_x$M$_a$X$_b$/CuF$_2$ | 1–1½ | 3½ | 2–2½ avg. | 200 nom. | 530 | 325 nom. | ? |
| d. Li$_x$M$_a$X$_b$MnO$_2$ | 1–1½ | 3½ | 2–2½ avg. | 200 nom. | 300 | 270 nom. | >1000 |

TABLE II-continued

| | Hypothetical Examples of Battery Types Detailed in Table I | | | | | | |
|---|---|---|---|---|---|---|---|
| | Voltage | | | Specific Reversible Capacity, Mah/gm | | Energy Density | 100% DOD Est. |
| Type of Description (Anode/Cathode) | vs. Li | | Working | | | | |
| | Anode | Cathode | Cell | Anode | Cathode | (Wh/Kg) | Cycle Life |
| VII. $Li_xM_aX_b$/$H_2O$ | 1-1¼ | 3 | 1¾ avg. | 200 nom. | 1490 (1 F/M) | 300 | ? |
| VIII. $Li_xM_aX_b$/$Li_yM_aX_b$ | 1-1¼ | 3-4 | 2¼-3 typ. | 200 nom. | 200 nom. | 300 nom. | >1000? |
| (As in I.-VII. above, using aqueous electrolyte solution instead of organic, non-aqueous liquids or solid electrolytes) | | | | | | | |
| IX. $Li_xM_aX_b$/Air ($O_2$, $H_2O$) | 1-1¼ | 3 | 1¾ avg. | 200 nom. | N/A | 350 | ? |

What is claimed is:

1. A high rate secondary electrochemical cell comprising:
    an anode comprising a reversible lithium intercalation compound selected from one or more transition metal chalcogenides having a relatively high lithium intercalation ability and a relatively low molecular weight and having the general formula:

$$Li_xM_aX_b,$$

where M is selected from transition metal(s); X is selected from O, S, Se, and Te; and
    where x, a and b are numbers representing relative combining ratios and wherein the intercalation compound has properties including a potential of no more than 1.5 V versus a lithium reference electrode and >200 mAh/gm intercalation/deintercalation capacity (<133 gm/Faraday);
    a compatible cathode having a cathode active material and a current collector; and an electrolyte system.

2. The electrochemical cell of claim 1 wherein M is selected from Sc, Ti, Y, Zr and combinations thereof.

3. The electrochemical cell of claim 2 wherein the cathode comprises an active metal material and a current collector and said electrolyte is an aqueous electrolyte.

4. The electrochemical cell of claim 1 wherein the cathode active material is selected from a group consisting of $SO_2$, $SOCl_2$, $(CF)_n$, $FeS_2$, $CuF_2$, PbI, $M_nO_2$, $Bi_2Pb_2O_5$, $V_2O_5$ and the electrolyte selected from non-aqueous or aqueous electrolytes with or without co-solvents.

5. The electrochemical cell of claim 1 wherein the cathode further comprises at least a second reversible lithium intercalation compound selected from a group consisting of those compatible with the material of the anode and the electrolyte system is either non-aqueous or aqueous with or without co-solvents.

6. The electrochemical cell of claim 5 wherein the electrolyte system is a non-aqueous organic ester-based electrolyte solution containing an amount of a lithium salt and $CO_2$ additive.

7. The electrochemical cell of claim 5 wherein the intercalation compound of the anode and the cathode is the same varying in the degree of lithium intercalation such that the anode is Li-doped and the cathode is Li-depleted.

8. The electrochemical cell of claim 7 wherein the intercalation compound is selected from $Li_xTiO_2$, $Li_xTi_2O_3$ (where $0<X\leq2.0$) and mixtures thereof.

9. A non-aqueous electrochemical cell comprising:
    an anode comprising a first reversible lithium intercalation compound or mixtures thereof selected from transition metal chalcogenides having a relatively high lithium intercalation ability and a relatively low molecular weight and having the general formula:

$$Li_xM_aX_b,$$

where M is selected from transition metal(s); X is selected from O, S, Se, and Te;
    where x, a and b are numbers representing relative combining ratios and wherein the intercalation compound has properties including a potential of no more than 1.5 V versus a lithium reference electrode and >200 mAh/gm intercalation/deintercalation capacity (<133 gm/Faraday);
    a cathode having a cathode active material comprising a second reversible lithium intercalation compound compatible with that of the anode; and a non-aqueous electrolyte system.

10. The electrochemical cell claim 9 wherein M is selected from Sc, Ti, Y, Zr and combinations thereof.

11. The electrochemical cell of claim 9 wherein M is Ti and X is O.

12. The electrochemical cell of claim 9 wherein the first and the second intercalation compounds are the same, varying in degree of lithium intercalation between anode which is in an highly reducing oxidation state and the cathode which is an highly oxidizing oxidation state.

13. The electrochemical cell of claim 9 wherein the non-aqueous electrolyte system further comprises a solid-state electrolyte/separator.

14. The electrochemical cell of claim 9 wherein the electrolyte further comprises an amount of $LiAsF_6$ and an amount of $LiBF_4$.

15. The electrochemical cell of claim 14 wherein an amount of $CO_2$ additive is dissolved in the electrolyte and in equilibrium with the vapor phase.

16. A non-aqueous electrochemical cell comprising:
    an anode comprising a first reversible lithium intercalation compound or mixtures thereof selected from transition metal chalcogenides having a relatively high lithium intercalation ability and a relatively low molecular weight and having the general formula:

$$Li_xTi_aO_b,$$

where $0.5 \leq x \leq 2$
    $a = 1$
    $b = 1.5 \leq b \leq 3$ and
    wherein the intercalation compound has properties including a potential of no more than 1.5 V versus a lithium reference electrode and >200 mAh/gm intercalation/deintercalation capacity (<133 gm/Faraday);
    a cathode having a cathode active material comprising a second reversible lithium intercalation compound compatible with that of the anode; and a non-aqueous electrolyte system.

17. The electrochemical cell of claim 16 wherein the intercalation compound of the anode is selected from $Li_xTiO_2$ and $Li_xTi_2O_3$ and mixtures thereof and the cathode active intercalation material is $Li_yCoO_2$ wherein $0 < y \leq 1.0$.

18. The electrochemical cell of claim 17 wherein the electrolyte system is a non-aqueous organic ester-based electrolyte solution containing an amount of a lithium salt and $CO_2$ additive.

* * * * *

UNITED STATES PATENT AND TRADEMARK OFFICE
CERTIFICATE OF CORRECTION

PATENT NO.  : 5,284,721
DATED       : February 8, 1994
INVENTOR(S) : Kirby W. Beard It is certified that error appears in the above-indentified patent and that said Letters Patent is hereby corrected as shown below:

In column 9, lines 23 and 24, "X is selected from O, S, Se, and Te; and" should be a separate subparagraph.

In column 9, line 32 and 33, "and an electrolyte system." should be a separate subparagraph.

In column 9, line 36, change the claim dependency from "2" to -- 1 -- .

In column 9, line 42, change "$M_4O_2$" to -- $MnO_2$ -- .

In column 9, line 43, after "electrolyte", insert -- is -- .

In column 10, lines 18 and 19, "X is selected from O, S, Se, and Te;" should be a separate subparagraph.

In column 10, lines 28 and 29, "and a non-aqueous electrolyte system" should be a separate subparagraph.

Signed and Sealed this

Twenty-third Day of August, 1994

Attest:

BRUCE LEHMAN

Attesting Officer    Commissioner of Patents and Trademarks